(12) United States Patent
Shu et al.

(10) Patent No.: US 8,504,644 B2
(45) Date of Patent: Aug. 6, 2013

(54) CONFIGURABLE CONTINUOUS WEB SERVICE INVOCATION ON PERVASIVE DEVICE

(75) Inventors: Chen Shu, Southbury, CT (US); Michael Van Der Meulen, Redding, CT (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 11/608,955

(22) Filed: Dec. 11, 2006

(65) Prior Publication Data

US 2008/0140803 A1 Jun. 12, 2008

(51) Int. Cl.
*G06F 15/16* (2006.01)

(52) U.S. Cl.
USPC .......................................... 709/217; 709/203

(58) Field of Classification Search
USPC ................ 709/201–203, 217–219; 707/1–10
See application file for complete search history.

(56) References Cited

U.S. PATENT DOCUMENTS

| | | | |
|---|---|---|---|
| 5,877,757 A * | 3/1999 | Baldwin et al. | 715/705 |
| 7,114,146 B2 | 9/2006 | Zhang et al. | 717/105 |
| 2002/0161745 A1* | 10/2002 | Call | 707/1 |
| 2002/0174117 A1 | 11/2002 | Nykanen | |
| 2003/0204622 A1 | 10/2003 | Blizniak et al. | 709/241 |
| 2004/0176968 A1 | 9/2004 | Syed et al. | 705/1 |
| 2004/0260949 A1* | 12/2004 | Aoki et al. | 713/201 |
| 2005/0015491 A1 | 1/2005 | Koeppel | 709/226 |
| 2005/0038708 A1 | 2/2005 | Wu | 705/26 |
| 2005/0071423 A1 | 3/2005 | Rajaniemi | |
| 2006/0190580 A1 | 8/2006 | Shu et al. | |

FOREIGN PATENT DOCUMENTS

| | | |
|---|---|---|
| JP | 2005284466 | 10/2005 |
| WO | 2006089880 | 8/2006 |

OTHER PUBLICATIONS

AOP for Dynamic Configuration and Management of Web Services, B. Verheecke et al., International Journal of Web Services Research; Jul.-Sep. 2004, pp. 25-41.
System Support for Pervasive Applications, R. Grimm et al., ACM Transactions on Computer Systems, vol. 22, No. 4, Nov. 2004, pp. 421-486.
Design and Evaluation of a Conit-Based Continuous Consistency Model for Replicated services, H. Yu et al., ACM Transactions on Computer Systems, vol. 20, No. 3, Aug. 2002, pp. 239-282.
Continuous Program Optimization: A Case Study, T. Kistler et al., ACM Transactions on Programming Languages and Systems, vol. 25, No. 4, Jul. 2003, pp. 500-548.
Impac—"On Demand Web Services—Based Business Process Composition", L. Zhang et al., SMC '03 Conference Proceedings, 2003 IEEE International Conference on Systems, Man and Cybernetics, Oct. 2003.

* cited by examiner

*Primary Examiner* — Afshawn Towfighi
(74) *Attorney, Agent, or Firm* — Fleit Gibbons Gutman Bongini & Bianco PL; Jon Gibbons; Thomas Grzesik

(57) ABSTRACT

A client computer is provisioned with interdependent list of web services comprising list information identifying a plurality of web services, wherein further, the list information relates information received from a first web service of the plurality of web services with a subsequently requested second web service. Results of a web service request are provided to another web service request by the client computer utilizing the relationship provided by the list information. Preferably the list information and web service messages from the client computer are XML metadata. A cooperating Generic Mobile Web Services Manager configures and forwards communication between the client and respective web services.

20 Claims, 17 Drawing Sheets

Employee Information
Name: John Smith — 704  703
Email: jsmith@acme.com — 705
Tel: (123) 456-7890 — 706
Fax: (123) 456-7899 — 707
Title: Software Rep for Acme — 708
Manager: bob@acme.com — 709
Location: 100 Mail St., Stamford, CT — 710
Department: Software Sales — 711
Division: 72 — 712

```
1   <services>
2   <service name="Customer Information"
3       id="customer_information"
4       url="http://services1.acme.com/"
5       urn="customerinformation"
6       method="lookup"
7       list="true">
8       <param name="Name"/>
9       <param name="ID"/>
10      <menu name="Account Rep" input="ID" pipe="$0" action="account_rep"/>
11      <menu name="Purchase History" input="ID" pipe="$0, 5"
12      action="purchase_history"/>
13  </service>
14  <service name="Employee Information"
15      id="employee_information"
16      url="http://services2.acme.com/"
17      urn="employeeinformation"
18      method="find"
19      list="true">
20      <param name="Email"/>
```

FIG. 9A

```
21  </service>
22  <service name="Account Rep"
23         id="account_rep"
24         url="http://services1.acme.com/"
25         urn="accountrep"
26         method="getAccountRep"
27         list="false" >
28      <param name="ID"/>
29      <menu name="Employee Information" input="Email" pipe="$0"
            action="employeeInformation"/>
30      <menu name="Sales Report" input="Email" pipe="$0, 5"
31         action="getSalesReport"/>
32  </service>
33  <service name="Sales Report"
34         id="sales_report"
35         url="http://services1.acme.com/"
36         urn="sales_report"
37         method="getSalesReport"
38         list="true" >
39      <param name="Email"/>
```

FIG. 9B

```
42  </service>
43  <service name="Purchase History"
44     id="purchas_history"
45     url="http://services2.acme.com/"
46     urn="purchasehistory"
47     method="getPurchaseHistory"
48     list="true">
49     <param name="ID"/>
50     <param name="history"/>
51  </service>
```

FIG. 9C

```
52  <services>
53  <service name="Customer Information"
54   id="customer_information"
55   list="true">
56    <param name="Name"/>
57    <param name="ID"/>
58    <menu name="Account Rep" input="ID" action="account_rep"/>
59    <menu name="Purchase History" input="ID" action="purchase_history"/>
60  </service>
61  <service name="Employee Information"
62   id="employee_information"
63   list="true">
64    <param name="Email"/>
65  </service>
66  <service name="Account Rep"
67   id="account_rep"
68   list="false">
69    <param name="ID"/>
70    <menu name="Employee Information" input="Email"
71     action="employeeinformation"/>
72    <menu name="Sales Report" input="Email" action="getSalesReport"/>
```

FIG. 10A

```
74  </service>
75  <service name="Sales Report"
76      id="sales_report"
77      list="true">
78      <param name="Email"/>
79  </service>
80  <service name="Purchase History"
81      id="purchas_history"
82      list="true">
83      <param name="ID"/>
84      <param name="history"/>
85  </service>
86  </services>
```

FIG. 10B

```
88  <service keyword="customer_information">
89  <arg>Acme</arg>
90  <arg></arg>
91  </service>
```

FIG. 11

```
1201  <Customers count="2">
1202    <Customer>
1203      <Name>Acme</Name>
1204      <ID>001</ID>
1205      <Address>123 Main St., Southbury, CT</Address>
1206    </Customer>
1207    <Customer>
1208      <Name>Acme</Name>
1209      <ID>002</ID>
1210      <Address>456 5th Ave, New York, NY</Address>
1211    </Customer>
1212  </Customers>
```

FIG. 12

```
1301  <service keyword="customer_information" action="account_rep">
1302    <arg>001</arg>
1303  </service>
```

FIG. 13

```
1401  <Reps>
1402  <Rep>
1403  <Name>John Smith</Name>
1404  <Email>jsmith@acme.com</Email>
1405  <Tel> (123)456-7890</Tel>
1406  <Title>Software Rep for Acme</Title>
1407  </Rep>
1408  <Rep>
1409  <Name>Sam Brook</Name>
1410  <Email>sbrook@acme.com</Email>
1411  <Tel> (123)456-7890</Tel>
1412  <Title> Hardware Rep for Acme</Title>
1413  </Rep>
1414  </Reps>
```

FIG. 14

CONFIGURABLE CONTINUOUS WEB SERVICE INVOCATION ON PERVASIVE DEVICE

FIELD OF THE INVENTION

The present invention is related to Web Services and is snore particularly related to providing efficient client access to Web Services for pervasive devices.

BACKGROUND OF THE INVENTION

With the growing popularity of pervasive devices and the increasing bandwidth of wireless communications, users want to have access to snore services at their finger tips while traveling without a PC. For example, a mobile salesperson may need services such as company inventory lookup, customer order status check, customer address lookup, etc.

A Web service is a software system identified by a URI, whose public interfaces and bindings are defined and described using XML. Its definition can be discovered by other software systems. These systems may then interact with the Web service in a manner prescribed by its definition, using XML based messages conveyed by Internet protocols.

Traditionally, developers had to write a program to enable the access to a web service. For non-developers, it's very difficult for them to find a program, for each web service that they need to access. Also, writing a program for each web service results in substantial cost in developing and support. Especially there is not, yet an efficient way available to pervasive device users to make use of multiple web services is a configurable and continuous fashion.

U.S. patent application Ser. No. 11/063,708: "DYNAMIC EXTENSIBLE LIGHTWEIGHT ACCESS TO WEB SERVICES FOR PERVASIVE DEVICES" filed Feb. 23, 2005; incorporated herein by reference, discloses a Generic Mobile Web Services (GMWS) manager that provides mobile clients with access to web Services. The GMWS manager provides an interface between Web Services and mobile clients {handheld PDAs for example}. The GMWS manager maintains a registry of supported Web Services and metadata attributes about the Web Services and the mobile client, information is transferred between a client and a registered web service by way of the GMWS manager based on attributes available to the GMWS manager.

US Patent Application Pub. No. 2005/0015491A1, "SYSTEM, METHODS, AND ARTICLES OF MANUFACTURE FOR DYNAMICALLY PROVIDING WEB SERVICES" filed May 16, 2003, incorporated herein by reference, discloses dynamically providing web services in a distributed system, in one embodiment, a distribution server uses a generic interface to invoke any one of a plurality of web services based on a user request at a client system. The distribution server provides content information that a client system uses to display a customized web page for an authorized user. When the user selects content on a customized web page associated with a web service, the client's system sets data values in one or more hidden fields and provides the fields to the distribution server. The server passes the field information to the selected web service to produce result data. The distribution server may use the result data and collected format data to generate the content information that is used to generate the customized web page for the authorized user. Embodiments of the present invention enable the distributed system to modify a web service without having to reprogram any consumers of the modified web service. Further, the distribution server is configured such that it dynamically and automatically determines any web services that a user may access and provides access to the authorized web services through the generic interface.

US Patent Application Pub. No. 2002/0174117A1 "MOBILE WEB SERVICES" filed May 15, 2001, incorporated herein by reference, describes a method is disclosed to enable a mobile phone or wireless PDA to discover Internet businesses and services by accessing the Universal Description, Discovery and Integration (UDDI) registry. The method facilitates the formation of a query to the UDDI registry for the wireless device user. The method constructs a personal user profile of the user's UDDI searching strategies and Internet accessing preferences. The user profile can be used as a shortcut for online or offline queries to the UDDI registry or for accessing pages from web sites, in response to the user's entry of abbreviated inputs to the wireless device. The method is embodied as programmed instructions which may be executed within the user's wireless device to query the UDDI registry. Alternately, method is embodied as programmed instructions which may foe executed within a separate knowledge engine server to query the UDDI registry in response to commands from the user's wireless device. The server can be used to cache files accessed from web sites, for selective forwarding to the user's wireless device.

US Patent Application No. 2005/0071423A1: "System, Apparatus, and Method for Providing Web Services on Mobile Devices" Filed Sep. 26, 2003 and incorporated herein by reference provides Web services from a mobile device. In one configuration, a method involves forming a Web service message at a first network entity. The Web service message is targeted for a mobile terminal. A request is directed to a locator arrangement to assist in processing the Web service message. The Web service message is sent to the mobile terminal utilizing the locator arrangement. The Web service message is sent to the mobile terminal using a mobile services transport protocol and processed at the mobile terminal.

Browsers do not provide a means to access Web Services directly. Customized Web pages and programs have to be developed for each web service to be accessed. This results in substantial cost in developing and support. Furthermore, using a browser to access Web Services from web pages involves extra network RTT (round trip time) as the customized web page and programs must be downloaded before the browser is capable of accessing the Web Service. With the communication, bandwidth limitation on pervasive devices, extra RTT has undesirable impact on the performance of the system.

Another approach is to make a customized client application that talks to the service for each web service. The disadvantage of this approach is that eventually the number of applications will outgrow the memory/storage limit of the device as the services increase. The total cost to develop, support and purchase each application is substantial.

SOA {Service Oriented Architecture} provides a perspective of software architecture that defines the use of services to support the requirements of software users. In an SOA environment, resources an a network are made available as independent services that can be accessed without knowledge of their underlying platform implementation. SOA is usually based on Web services standards (e.g., using SOAP or REST) that have gained broad industry acceptance. These standards also provide greater interoperability and some protection from lock-in to proprietary vendor software. The present invention, is in the domain of SOA enablement on pervasive (mobile) devices. The invention enables integration and continuous web service invocation through simple configuration.

There are solutions offered to enable web service access from pervasive device by different vendors. For example, BlackBerry™ Mobile Data System v4.1 from RESEARCH IN MOTION (RIM®) allows a generated web service client to be pushed to the device so that user can use the client to access the corresponding web service. IBM® Web Services Tool Kit offers "tools and run-time environments that allow development of applications that use Web services on small mobile devices, gateway devices, and intelligent controllers". However, the existing tools or products do not provide a mechanism for the client/device to call another web service using the result returned from a previous web service access.

SUMMARY OF THE INVENTION

The present invention enables a list of services with associated metadata related to the services and the calling relationships between, services to be provided to the client running on a pervasive device. The client that runs on the device can then call a first web service, get the result of the said first web service, then call a second web service within the context of information received from the first web service. Similarly, when the result of the second web service comes back to the client, the client can call a third web service within the context of the information returned from the second web service. Variations of the invention consistent with the teaching herein are possible, including but not limited to for example, accessing multiple web services with results from a single web service access.

According to one aspect of the present invention invention, the calling sequences can be configured dynamically on the server side and provisioned to the client. The client that runs on the device need not be changed.

It is therefore an object of the invention to provide a computer implemented capability for accessing web services. The capability including a client computer having an interdependent list of web services, responsive to user input, selects a first web service of the interdependent list of web services, wherein the interdependent list of web services comprises list information identifying a plurality of web services, wherein further, the list information relates information received from a first web service of the plurality of web services with a subsequently requested second web service. According to the list information, responsive to the selecting step, a first web service request is sent from the client computer to the first web service. Responsive to the sanding step, first information from the first web service is received at the client computer. Responsive to user input, the second web service of the interdependent list of web services is selected. According to the list information, said first information received is utilized to formulate a second web service request for said selected second web service, the formulated second web service request is sent from the client computer to the second web service. Finally, responsive to the sending step, second information from the second web service is received at the client computer.

It is a farther object of the invention to further, according to the list information, responsive to user input, select a third web service of the list of web services. According to the list information, any one of said second information received or said first information received is utilized to formulate a third web service request. To send the formulated third web service from the client computer to the third web service. Responsive to the sending step, third information is received from the third web service at the client computer.

It is yet another object of the invention to send one or more additional web service requests.

It is a further object of the invention to receive the interdependent list information at the client computer, the interdependent list comprising metadata, the interdependent list information configured by a GMWSM server from configurable interdependent list of web services and associated metadata. A representation of one or more of the plurality of web services is displayed to the user based on a configuration according to said interdependent list. The received metadata of the interdependent list is used, when formulating any one of said first web service request or said second web service request. The received metadata of the interdependent list is utilized when creating the client graphical user interface including any one of buttons or menus, the client graphical user interface comprising the capability to navigate from said first web service result display to said second web service input display.

In another aspect of the invention the client computer sends the first web service request to a Generic Mobile Web Services Manager, wherein the client computer sends the second web service request to a Generic Mobile Web Services Manger, wherein the client computer receives a interdependent list of services and associated metadata from the Generic Mobile Web Services Manager, wherein the client computer receives the first information from the Generic Mobile Web Services Manager wherein the Generic Mobile Web Services Manager communicates with web services on behalf of the client computer.

It is an object of the invention, to provide the interdependent, list of web services and the metadata associated with the interdependent list of services at the client computer consisting of XML statements.

It is another object of the invention for the client computer to prompt the user with candidate web service selections according to said list information. The client computer presents the user selected selection to the user according to said list information, wherein the prompting and presenting interface to the user consist of any one of a GUI, audio, keypad, mouse or mechanical actuation.

In a further object of the invention, each of the first web service request, the first information received and the second web service request comprise XML statements.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which;

FIGS. 3-7 depict example successive GUI displays according to an embodiment of the invention;

FIGS. 9A-9C depict example XML metadata configured on the GMWSM (Generic Mobile Web Services Manager);

FIGS. 10A-10B depict example XML metadata provisioned to the mobile client;

FIG. 11 depicts an example request for "Customer Information" from the client to the GMWSM;

FIG. 12 depicts an example response of "Customer Information" from the GMWSM to the client;

FIG. 13 depicts as example request for "Account Rep" from the client to GMWSM;

FIG. 14 depicts an example response of "Account Rep" from GMWSM to client; and

DESCRIPTION OF THE PREFERRED EMBODIMENTS

Due to the steady advances in technology, mobile computers are now available as palm-top or hand-held devices, such as personal digital assistants (PDAs), in-vehicle devices, business organizers, and the like. In addition, many people now utilize cellular telephones to access the Internet and to perform various other computing functions. Portable computing devices including, but not limited to, palm-tops, PDAs, and cellular telephones are often collectively referred to as "pervasive" or "mobile" computing devices.

Figure 1:
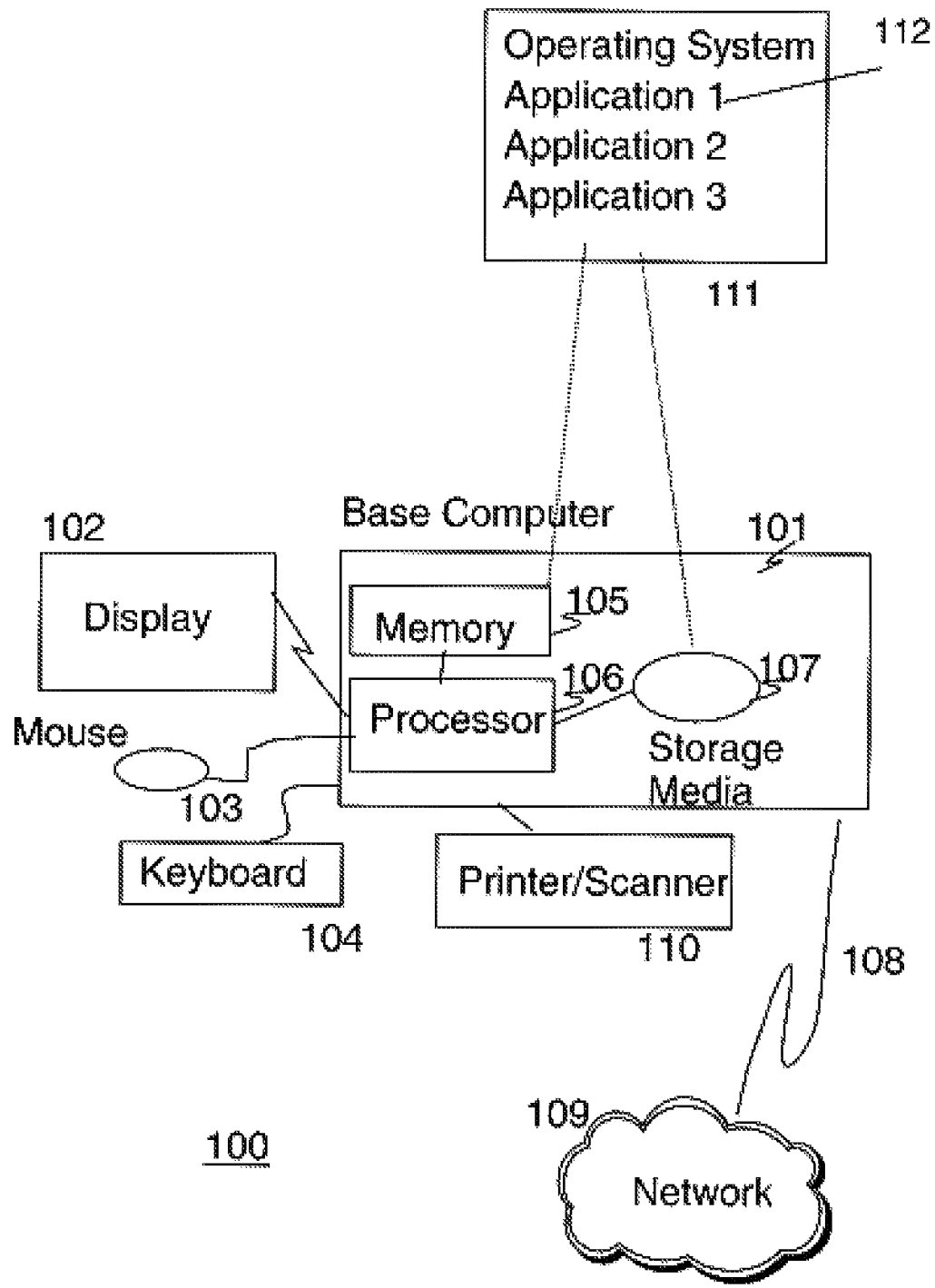
FIG. 1 is a diagram depicting example prior art elements of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
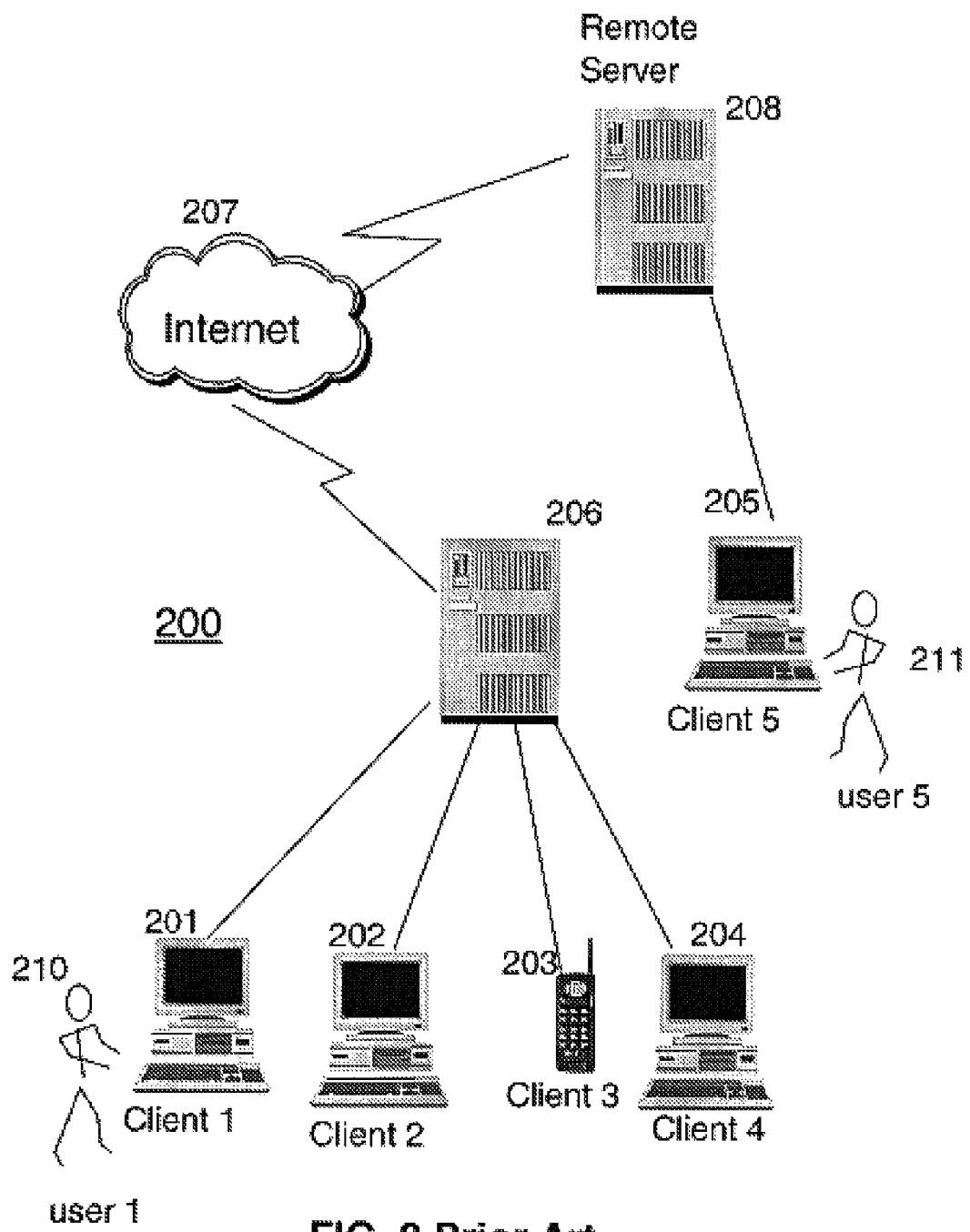
FIG. 2 is a diagram depicting example prior art elements of a computer network.

FIG. 2 illustrates a data processing network 200 in which the present invention may be practiced. The data processing network 200 may include a plurality of individual networks, such as a wireless network and a wired network, each of which may include a plurality of individual, workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 205 may be preferably coupled to another network, (the Internet 207 for example) by means of a communications link. The gateway 206 may also be directly coupled to one or more workstations 101 using a communications link. The gateway computer may be implemented utilizing an IBM eServer zSeries® 900 Server available from IBM Corp.

Software programming code which embodies the present invention is typically accessed by the processor 106 of the system 101 from long-term storage media 107, such as a CD-ROM drive or hard drive. The software, programming code may be embodied on any of a variety of known media for use with a data processing system, such as a diskette, hard drive, or CD-ROM. The code may be distributed on such, media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known, and will not be further discussed herein.

In a preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that, application, without deviating from the inventive concepts disclosed herein. The application 111 may be executing in a Web environment, where a Web server provides services in response to requests from, a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

The present invention provides Web Services by way of a server application to a mobile client device. The server application interprets keywords from the client device to a form compatible with a desired web service. Thus the client device requires minimal software knowledge of the web service as the server application manages the interfaces. Preferably, the server application has a list (registry) of supported Web Services and is able to provide the list to the client device. In a preferred embodiment, various forms of communications from the client device are supported. For example text or audio-voice is supported whereby the server application provides a translator for translating voice into text or text into voice.

Figure 15:
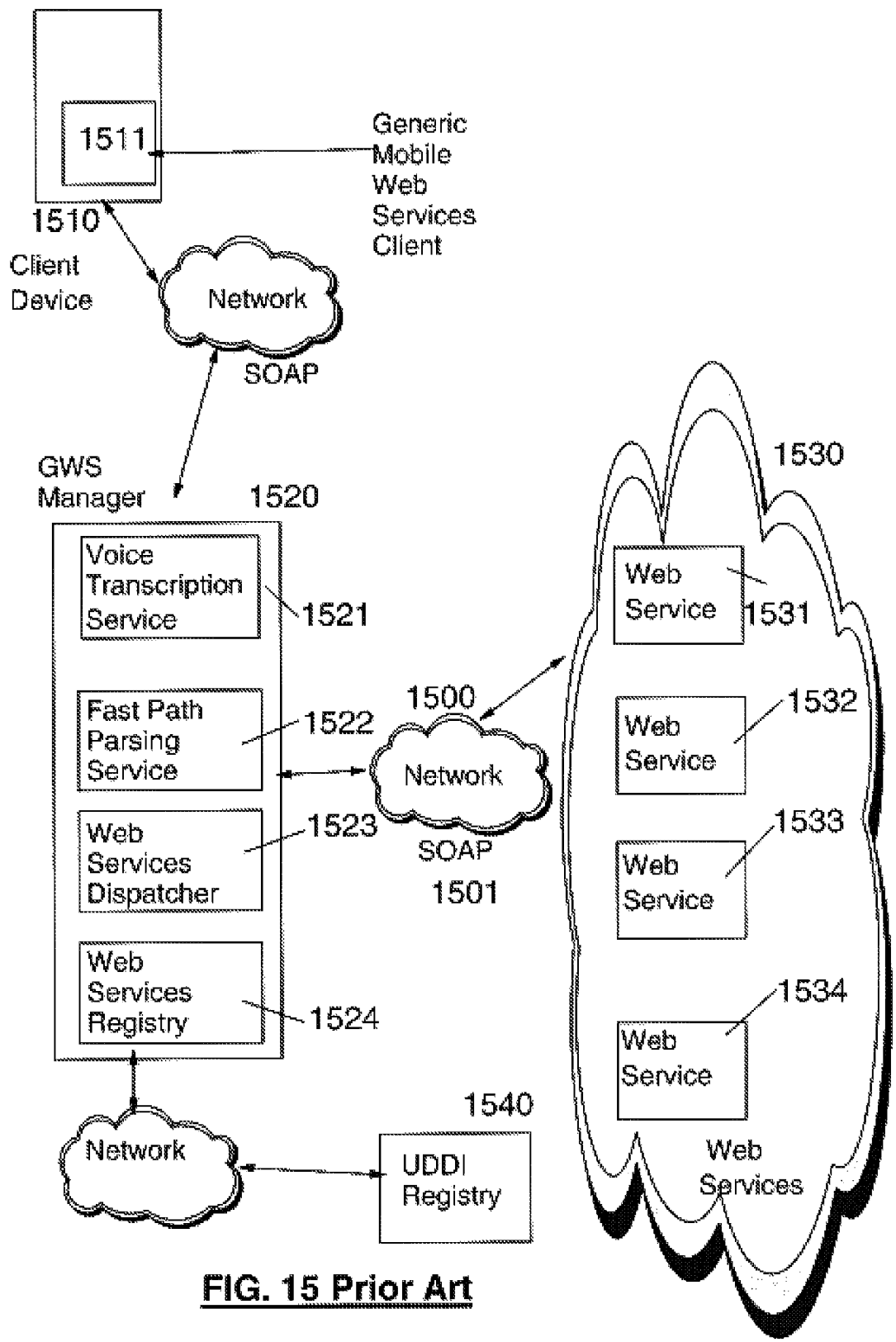
FIG. 15 is a diagram depleting example prior art elements of a web service computer network.

Preferably, referring to FIG. 15, a Mobile Web Services Manager (GMWSM) server application 1520, in communication 1500 with a mobile client device 1510, downloads XML metadata to the client device 1510. The metadata is used by the client device 1510 for presenting prompts and formulating web service request messages for web services 1531 1532 1533 1534 at the client to be sent to the server 1520 which performs the web service request(s) on behalf of the client 1511 by way of the network 1500. The Generic Mobile Web Services Manager (GMWSM) 1520 also preferably utilizes XML metadata in formulating messages and handling messages to/from the client 1511.

Figure 3:
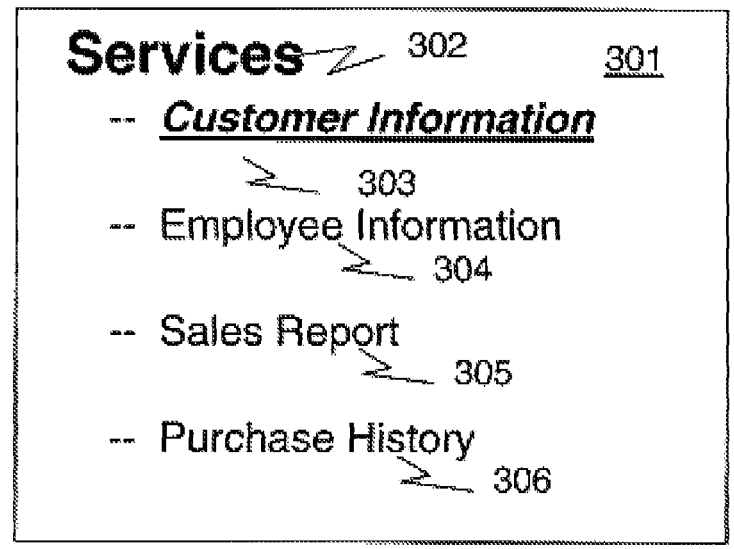
Figure 4:
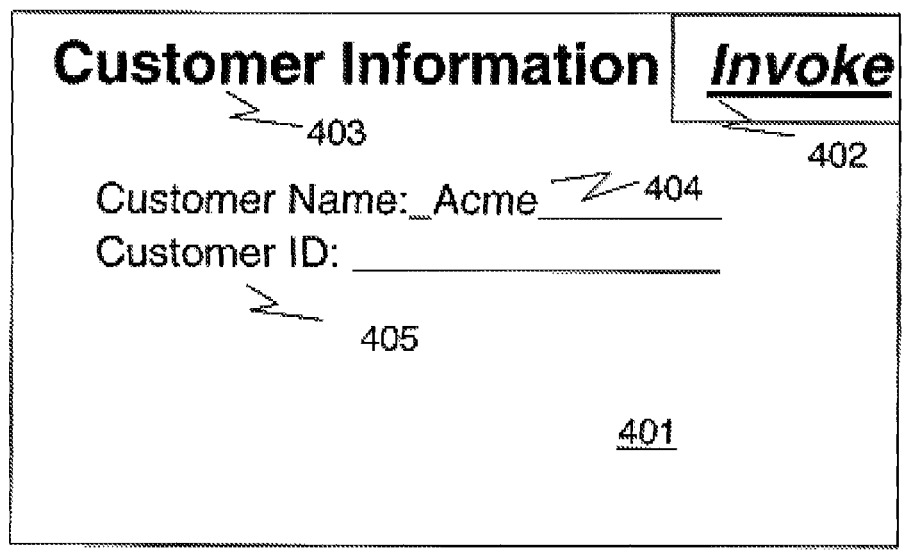
Figure 5:
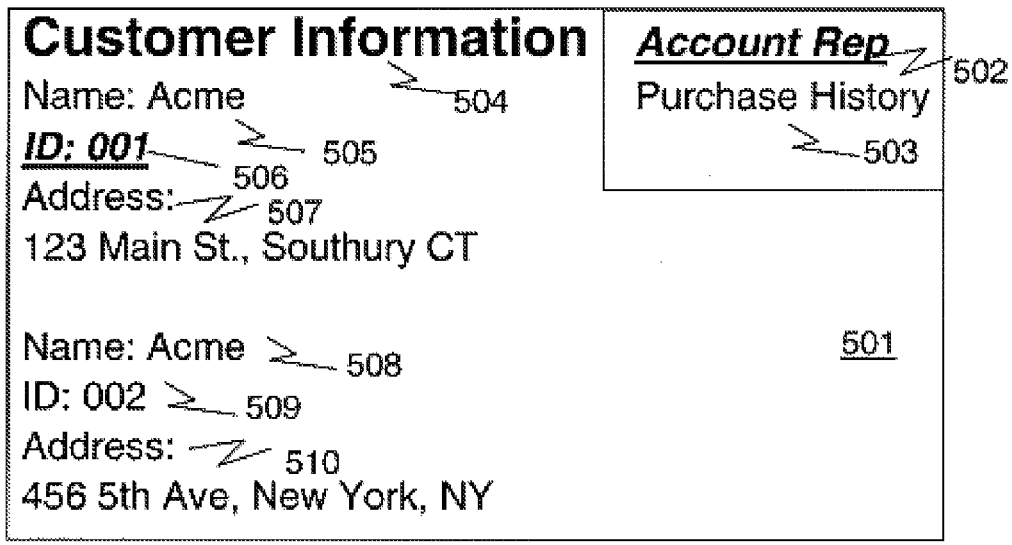
Figure 6:
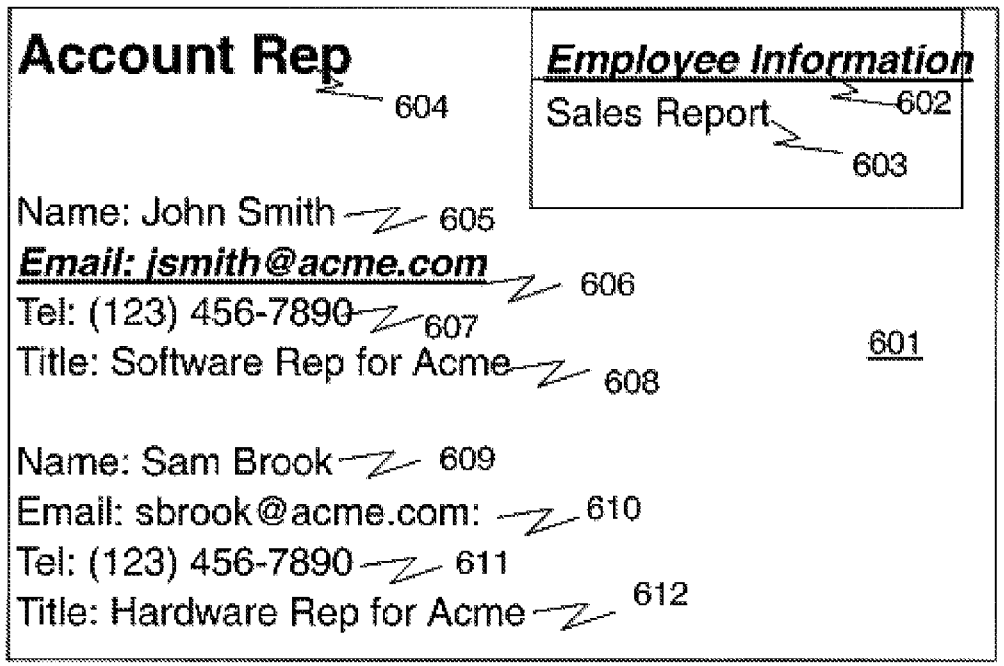

Referring now to FIG. 3, a user is prompted by a GUI display 301 on his mobile (client) device. The display preferably comprises one or more topics 302 and a list of services 303 304 305 306. The display optionally presents topics and services using widgets, numbering or pull-down menus or any technique well known in the art. In the example, the display presents the topic "Services" and the user selects an item (service) on the GUI using a keypad, curser, touch screen or voice actuation or any technique well known in the art. The user selects a service in this case "Customer information" 303 at his GUI display 301. The GUI is updated to highlight (underscore) the selected service "Customer Information" 303. Based on the user's selection (and the client metadata), the user's mobile device navigates to a new GUI display prompt 401 (FIG. 4) having a topic "Customer information" 403 and a list of items "Customer Name" 404 and "Customer ID" 405. The user fills in the information in the appropriate item(s) (in our example, the user eaters "Acme" in "Customer Name:" item 404. The user invokes the web services by selecting the client provided "Invoke" button 402. The GUI is updated, to highlight (underscore) the selection of "Invoke" 402. Responsive to the selection of "invoke" 402, the client sends a web service request including "Acme" metadata to the "Customer Information" web service by way of the GMWSM server. When the response of the invoked web service is received by the mobile device, the client presents the information at the display (FIG. 5) 501. The mobile device displays 501 the results including topic "Customer Information" 504 as well as items related to the topic 505 506 507 508 509 510, also including function dependent on the web service invoked previously and presented as navigation items "Account Rep 502 and "Purchase History" 503. Next the user can navigate to another display by selecting a customer ID "001" 506 which is then highlighted on the display and then selecting an appropriate navigation item "Account Rep" 502. The selection of the navigation item 502 invokes an "Account Rep web service" request including metadata "ID: "001" 506. The "Account Rep web service" returns information to the client via the GMWSM server and the client navigates to the new mobile device display "Account Rep" 601 (FIG. 6). The display 601 now presents navigation items 602 603 and a new topic 604 and new items 605 606 607 608 609 610 611 612 including information derived from the "account rep web service". The user selects an item "Email: jssmith@acme.com" 606 and the "Employee Information" menu item. This action sends metadata "Email: jsmith@acme.com" 606 to the "Employee Information web service". The response from the web service causes the client display to navigate to a new display FIG. 7 701. The new display 701 includes a topic "Employee information" 703 and a list of items 704 705 706 707 708 709 710 711 712.

Figure 8A:
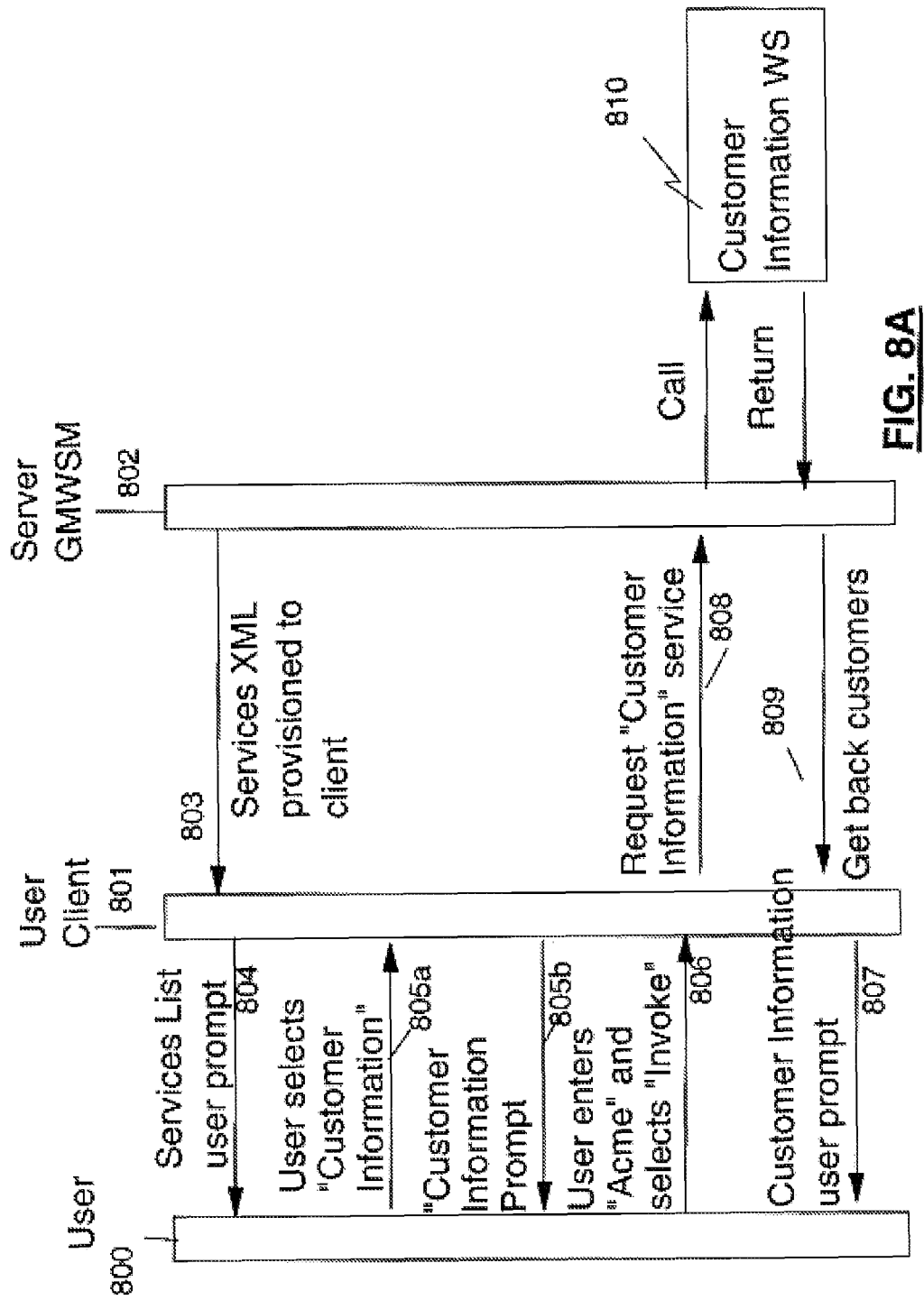
FIGS. 8A-8B depict a flow of example successive actions according to an embodiment of the invention.
Figure 8B:
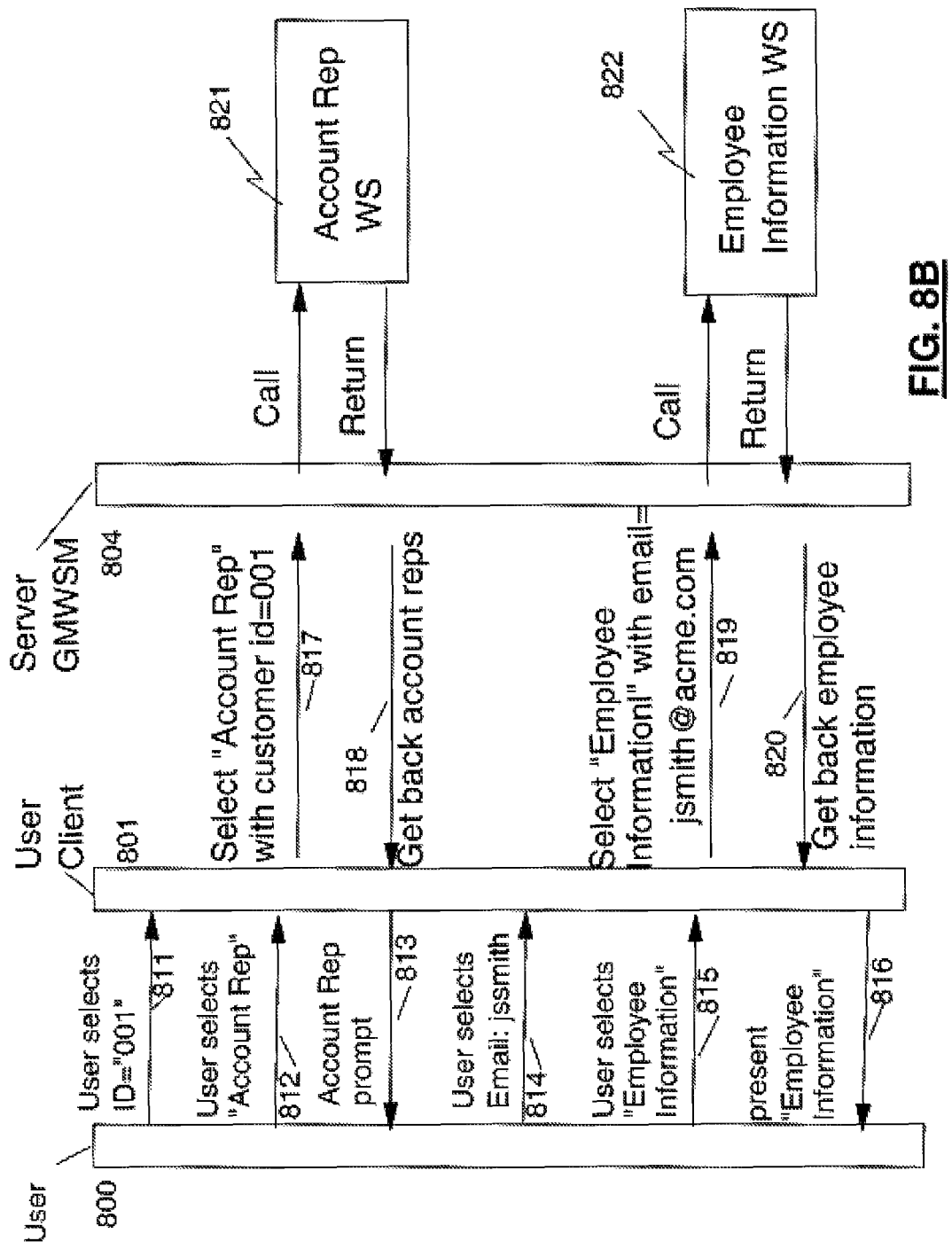

FIGS. 8A and 8B depict the flow of the example embodiment previously described. Referring to FIG. 8A, the mobile client 801 receives services XML from the server 802. The services XML includes a list of services and XML metadata supporting the list of services. The list of services is presented 804 as a prompt to the user 800. The user 800 selects a service "Customer information" 805a and is prompted for customer information 805b. The mobile client user 800 enters customer information "Acme" and selects the button "Invoke" which causes the client 801 to request 808 information from a "Customer Information web service" 810 via server 802. The server 802 returns 809 the customer information from the web service 810 to the client 801 which is presented, 807 to the user 800 in a prompt screen. Next, referring to FIG. 8B, the user selects 811 an item in the prompt ID="100" and requests 812 information from an "Account Rep web service" 821 via 817 the client 801 via server 804. The server 804 returns 818 the information from the web service 821 to the client 801 which creates 813 an "Account Rep web service" prompt to the user 800. Next the user 800 selects an email item in the prompt and initiates an "Employee Information service request" 815 to the Client 801. The client incorporates the metadata from the user request, and requests 819 info mat ion from an "Employee information web site" 822 via server 804. The server 804 returns 820 the employee information from the "Employee Information web service" to the client 801 which displays 816 the information to the user 801. Preferably, the server performs function on the request and response on behalf of the client. Such function may include formatting data, formatting GUI format, transforming information for example between text and voice or image, performing multiple web service calls in response to a single client request, transforming protocols and the like.

Preferably, metadata (FIGS. 9A through 9C) about the services and relations between services is kept on the server side which can be configured dynamically and the client is provisioned with a subset of the metadata (FIGS. 10A through 10B).

FIGS. 9A through 9C demonstrate an example embodiment of the invention server metadata with corresponding client metadata shown in FIGS. 10A through 10B. There are five web services configured as the "service" element in the metadata XML. The web services are "Customer information" 2, "Employee Information" 14, "Account Rep" 22, "Sales Report" 35 and "Purchase History" 43. Each web service has an "id" 3 15 23 36 43 attribute to uniquely identify the service, "url" 4 16 24 37 45, "urn" 5 17 25 38 46, and "method" 6 18 26 39 47 attributes are used to locate and invoke the web service. The "list" attribute 7 19 27 40 48 in the "service" represents if the service will be displayed in the first list view of services as in FIG. 3. All the services can be configured to be either visible or not visible in the first list view depending what is the most efficient way for user to use them, "param" elements 8 9 20 28 41 49 50 are used to define the UI components on the client mobile devices.

The calling sequence is configured by adding a "menu" 10 11 18 29 31 in the "service" element. Attribute "action" 12 30 32 represents the id of the web service that's defined in the xml. For example, "Customer Information" service has two menus. "Account Rep" 10 and "Purchase History" 11. This way "Account Rep" and "Purchase History" web services are available to the user after the result of "Customer Information" is returned, "input" attribute 10 11 contains a comma delimited list of attribute names. It defines what parts in the first web service return are used in the second web service request. The client will take the corresponding "input" field and send it in the request to the GMWSM, "pipe" attribute in the "menu" element 10 11 is used to define the arguments including the order to pass to the secondary web service. For instance, "$0, $1" means passing the first and second "input" attribute from the first web service response in that exact order to the next web service request, while, "$1, $0" means passing the first and second "input" attribute from the first web service response but in the reverse order to the next web service request. In the case of "Purchase History" 11, we pass $0, which is "001" as customer "ID", and 5 for "history", to the secondary web service. As the "piping" only happens on GMWSM side, so "pipe" is not provisioned to the client.

FIGS. 10A-10B depict example XML metadata provisioned to the mobile client. As can be seen in the example, the client version of the XML differs from the Generic Mobile Web Services Manager (GMWSM) server version in that the client XML does not include "URL" 4 16 24 37 45 "URN" 5 17 25 38 46 or "method" 6 18 26 39 47 and also, does not include "pipe" information in "menu" statements 10 11 12 18 29 30 31 32.

FIG. 11 depicts an example request XML for "Customer information" web service from the client to the GMWSM having a first argument "Acme" and a null second argument. As previously described "Acme" was provided by the user at the client computer.

FIG. 12 depicts an example response XML of "Customer information" web service from the GMWSM to the client. Information about two "Acme" 1203 1208 customers are being returned having different ID's 1204 1209 and Addresses 1205 1210.

FIG. 13 depicts an example XML request for "Account Rep" web service 1301 from the client to GMWSM. The request includes an argument 1302 which is the selected ID "001" returned from, the previous "Customer Information" web service.

FIG. 14 depicts an example XML response of "Account Rep" web service from GMWSM to client. The response, includes information about two reps 1403 1409. The information includes an email address 1404 1410, a telephone number 1405 1411 and a title 1406 1412 for each of the two reps.

Referring to FIG. 15, one embodiment the present invention is implemented on a Client Device 1510 (Preferably a mobile handheld computer or PDA for example) in communication with a Generic Mobile Web Services Manager (GMWSM) 1520. The 1520 has network access 1500 to Web Services 1530 and a UDDI Registry 1540. Preferably networks 1500 comprise the Internet. The communication protocols are SOAP 1501 protocols.

The SOAP Internet-Draft (search.ietf.org/Internet-drafts/draft-box-http-soap-01.txt) provides the following example of a SOAP request:

```
1.  POST /StockQuote HTTP/1.1
2.  Host: www.stockquoteserver.com
3.  Content-Type: text/xml
4.  Content-Length: nnnn
5.  SOAPMethodName: Some-Namespace-URI#GetLastTradePrice
6.  <SOAP:Envelope xmlns:SOAP="urn:schemas-xmlsoap-
    org:soap.v1">
7.    <SOAP:Body>
8.      <m:GetLastTradePrice xmlns:m="Some-Namespace-URI">
9.    <symbol>DIS</symbol>
10.     </m:GetLastTradePrice>
```

-continued
```
11.   </SOAP:Body>
12. </SOAP:Envelope>
```

This request can be divided into 2 parts;
    HTTP header (lines 1-5)
    XML-RPC payload (lines 6-12, the SOAP:Envelope element)

The Client Device 1510 preferably employs an operating system, such, as MICROSOFT WINDOWS™, MICROSOFT WINDOWS CE, PALM OS™, and BLACKBERRY™.

Generic Mobile Web Services Client (GMWSC) 1511 resides in Client Device 1510. It gets the Web Services metadata from GMWSM 1520 and generates a user interface for the user on the Client Device 1510. It also sends the web service request to GMWSM 1520.

The GMWSC 1511 is preferably implemented in JAVA™ programming language as a standalone application installed on the device, which, should provide a JVM™ (Java Virtual Machine).

GMWSM 1520 preferably includes four components: a Voice Transcription Service 1521, a Fast Path Parsing Service 1522, a Web Service Dispatcher 1523 and a Web Service Registry 1524.

GMWSM 1520 is preferably implemented in JAVA programming language running as a server application in an Application Server, such as IBM WEBSPHERE™.

The Fast Path Parsing Service 1522 is used for parsing and converting Fast Path commands received from a client 1511 into XML format. A Fast Path command is a semi-natural language sentence, it has keyword(s) and several input attributes for a web service. The multi-word attribute should be enclosed in quotes. The keywords and or command format is known to the GMWS Manager's Fast Path Parsing service 1522.

Web Services Registry (WSR) 1524 contains the metadata information of managed mobile Web Services. Available Web Services may include one or more web service 1530. Each web service 1530 can be registered with the Web Services Registry 1524 by providing the following metadata:
1. name of the web service
2. Category of the web service
3. Endpoint of the web service
4. Operation of the web service
5. Description of the web service
6. Name of the input and output field
7. Type of the input and output field
8. Default value of the input field if applicable
9. Keyword(s) of the first web service
10. Flag to identify whether or not to display the field to the user on Client Device
11. An XSL style sheet for output transformation if applicable
12. A template for Fast Path command parsing
13. Security requirement of the first web service The items 1 to 8 can also be obtained from a UDDI Registry 1540 if the web service has a Universal Description Discovery Interface (UDDI) entry. The WSR will get information such as the request/response message format, service address etc. from the UDDI entry. The template for Fast Path Parsing can be implemented as a regular expression.

Web Services Dispatcher 1523 is also responsible for invoking the web service after receiving the request from the client 1511. A preprocess may be applied to add in any hidden input fields before invoking the Web Services. After a response is received from the web service, the response may be transformed by the Web Services Dispatcher 1523 to a form acceptable by the client and then transferred back to the client 1511.

As another example embodiment, a Client 1511 logs into the GMWSM 1520. The user starts the GMWSC application 1511 at his Client Device. The user provides his credentials (ID and Password). (The credentials might be saved at the Client such that they are automatically provided by the client software. The client requests a list of Web Services 1531 1532 1533 1534 from the GMWSM 1520 with, user predefined profile. The client receives a list of Web Services and metadata from the GMWSM. The metadata received is used by the client 1511 to formulate communications to and from the GMWSM 1520 and to provide GUI structure. Preferably, a user can elect one of many communications means to access a web service. For example, Voice, Fast Path (predetermined syntax rule text), natural language or by selecting a specific web service.

The user may elect any of Voice input, or a specific web service for communications with the GMWSM 1520. In the case of Voice input, the client calls the Voice Transcription component and optionally receives the text version of his voice call. (Optionally, the user may receive a voice version of the text response). Optionally the user can make adjustments to his original syntax in light of the response text. The system generates voice input interface for that selected web service. The client sends the user input to the WSD. Then, the client receives the response and generates a GUI display or voice output. And similar to the flow described in FIGS. 8A and 8B, the return from the first web service can be used as the input to the second web service.

Optionally the user elects to select a specific web service 1531. The system generates the input interface for that web service. The user provides input which the client uses to generate XML input and calls WSD for XML input. Then, the client receives the response and generates a GUI display. And similar to the flow described in FIGS. 8A and 8B, the return from the first web service can be used as the input to the second web service.

The capabilities of the present invention can be implemented in software, firmware, hardware or some combination thereof.

As one example, one or more aspects of the present invention can be included, in an article of manufacture (e.g., one or more computer program products) having, for instance, computer usable media. The media has embodied therein, for instance, computer readable program code means for providing and facilitating the capabilities of the present invention. The article of manufacture can be included as a pert of a computer system or sold separately.

Additionally, at least one program, storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While a preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A computer program product for providing web services to clients by way of a Generic Mobile Web Services Manager, the computer program product comprising:
a non-transitory storage medium readable by a processing circuit and storing instructions for execution by the processing circuit for performing steps comprising:
a) responsive to user input, selecting at a client computer a first web service identifier (ID) of an interdependent list of web service IDs displayed to the user, the web service IDs corresponding to respective web services of a plurality of web services, wherein the interdependent list of web service IDs comprises list information, wherein the list information at least identifies a set of information that is to be passed from a response received from a first web service of the plurality of web services to a request that is to be sent from the client computer to a subsequent second web service, and wherein the set of information passed to the request is used as an input by the subsequent second web service to provide a response to the request,
wherein a web service is a software system identified by a Uniform Resource Indicator (URI), whose public interfaces and bindings are defined and described using an Extensible Markup Language (XML), wherein the interdependent list of web service IDs is absent any URI information for locating a web service corresponding to any web service ID of the interdependent list of web service IDs;
b) according to the list information, responsive to the selecting, sending a first web service request from the client computer to the first web service, the first web service request comprising the first web service ID usable by a Generic Mobile Web Services Manager (GMWSM) server for obtaining a URI for directing the first web service request to the first web service;
c) responsive to the sending, receiving first information from the first web service at the client computer;
d) responsive to user input, selecting a second web service ID of the interdependent list of web service IDs;
e) according to the list information, identifying at least one value from the first information required by the second web service;
f) formulating a second web service request comprising at least one value from the first information and the second web service ID usable by the GMWSM server for obtaining a URI for directing the second web service request to the second web service; and
g) sending the formulated second web service request from the client computer to the second web service.

2. The computer program product according to claim 1, further comprising:
h) responsive to sending the formulated second web service request, receiving second information from the second web service at the client computer;
i) according to the list information, responsive to user input, selecting a third web service ID of the interdependent list of web service IDs;
j) according to the list information, utilizing any one of the second information received or the first information received to formulate a third web service request; and
k) sending the formulated third web service request from the client computer to the third web service, the third web service request comprising the third web service ID usable by the GMWSM server for obtaining a URI for directing the third web service request to the third web service; and l) responsive to sending the third web service request, receiving third information from the third web service at the client computer.

3. The computer program product according to claim 2, wherein h) through k) are repeated for sending one or more additional web service requests.

4. The computer program product according to claim 1, further comprising:
receiving the interdependent list of web service IDs at the client computer, the interdependent list comprising metadata, the interdependent list of web service IDs configured by the GMWSM server from a configurable interdependent list of web services and associated metadata comprising the web service IDs and corresponding web service URIs;
displaying at a client graphical user interface (GUI) a representation of one or more of the plurality of web services to the user based on a configuration according to the interdependent list;
utilizing the received metadata of the interdependent list for formulating any one of the first web service request or the second web service request; and
utilizing the received metadata of the interdependent list for creating the client graphical user interface (GUI) including any one of buttons or menus, the client graphical user interface comprising the capability to navigate from a first web service result display to a second web service input display.

5. The computer program product according to claim 4, wherein the client computer sends the first web service request to a GMWSM, wherein the client computer sends the second web service request to the GMWSM, wherein the client computer receives the interdependent list of web services and associated metadata from the GMWSM, wherein the client computer receives the first information from the GMWSM, wherein the GMWSM communicates with web services on behalf of the client computer.

6. The computer program product according to claim 4, wherein the interdependent list of web services and the metadata associated with the interdependent list of web services at the client computer consist of XML statements.

7. The computer program product according to claim 1, further comprising:
the client computer prompting the user with candidate web service selections according to the interdependent list of web services; and
the client computer presenting the user selected selection to the user according to the interdependent list of web services, wherein the prompting and presenting interface to the user consist of any one of a GUI, audio, keypad, mouse or mechanical actuation.

8. The computer program product according to claim 1, further comprising:
wherein each of the first web service request, the first information received and the second web service request comprise XML statements.

9. A computer implemented method comprising:
a) responsive to user input, selecting at a client computer a first web service identifier (ID) of an interdependent list of web service IDs, the web service IDs corresponding to respective web services of a plurality of web services, wherein the interdependent list of web service IDs comprises list information wherein the list information at least identifies a set of information that is to be passed from a response received from a first web service of the plurality of web services to a request that is to be sent from the client computer to a subsequent second web service, and wherein the set of information passed to the request is used as an input by the subsequent second web service to provide a response to the request,
wherein a web service is a software system identified by a Uniform Resource Indicator (URI), whose public interfaces and bindings are defined and described using an Extensible Markup Language (XML), wherein the interdependent list of web service IDs is absent any URI information for locating a web service corresponding to any web service ID of the interdependent list of web service IDs;
b) according to the list information, responsive to the selecting, sending a first web service request from the client computer to the first web service, the first web service request comprising the first web service ID usable by a Generic Mobile Web Services Manager (GMWSM) server for obtaining a URI for directing the first web service request to the first web service;
c) responsive to the sending, receiving first information from the first web service at the client computer;
d) responsive to user input, selecting a second web service ID of the interdependent list of web service IDs;
e) according to the list information, identifying at least one value from the first information required by the second web service;
f) formulating a second web service request comprising at least one value from the first information and the second web service ID usable by the GMWSM server for obtaining a URI for directing the second web service request to the second web service; and
g) sending the formulated second web service request from the client computer to the second web service.

10. The method according to claim 9, further comprising:
h) responsive to sending the second web service request, receiving second information from the second web service at the client computer;
i) according to the list information, responsive to user input, selecting a third web service ID of the interdependent list of web service IDs;
j) according to the list information, utilizing any one of the second information received or the first information received to formulate a third web service request; and
k) sending the formulated third web service request from the client computer to the third web service, the formulated third web service request comprising the third web service ID usable by the server for obtaining a URI for directing the formulated third web service request to the third web service; and
l) responsive to sending the third web service request, receiving third information from the third web service at the client computer.

11. The method according to claim 9, further comprising:
receiving the interdependent list of web service IDs at the client computer, the interdependent list comprising metadata, the interdependent list of web service IDs configured by a GMWSM server from a configurable interdependent list of web services and associated metadata comprising the web service IDs and corresponding web service URIs;
displaying at a client graphical user interface (GUI) a representation of one or more of the plurality of web services to the user based on a configuration according to the interdependent list;
utilizing the received metadata of the interdependent list for formulating any one of the first web service request or the second web service request; and utilizing the received metadata of the interdependent list for creating the client graphical user interface (GUI) including any one of buttons or menus, the client graphical user interface comprising the capability to navigate from a first web service result display to a second web service input display.

12. The method according to claim 9, further comprising:
the client computer prompting the user with candidate web service selections according to the interdependent list of web services; and
the client computer presenting the user selected selection to the user according to the interdependent list of web services, wherein the prompting and presenting interface to the user consist of any one of a GUI, audio, keypad, mouse or mechanical actuation.

13. A system for providing web services to clients by way of a Generic Mobile Web Services Manager, the system comprising:
a network;
a client computer system in network communication with one or more web services by way of a server wherein the system performs steps comprising:
a) responsive to user input, selecting at a client computer a first web service identifier (ID) of an interdependent list of web service IDs, the web service IDs corresponding to respective web services of a plurality of web services, wherein the interdependent list of web services IDs comprises list information wherein the list information at least
identifies a set of attributes that is to be passed from a response received from a first web service of the plurality of web services to a request that is to be sent from the client computer to a subsequent second web service, and
identifies an order in which the set of attributes are to be passed to the request, and wherein the set of attributes passed to the request is used as an input by the subsequent second web service to provide a response to the request,
wherein a web service is a software system identified by a Uniform Resource Indicator (URI), whose public interfaces and bindings are defined and described using an Extensible Markup Language (XML), wherein the interdependent list of web service IDs is absent any URI information for locating a web service corresponding to any web service ID of the interdependent list of web service IDs;
b) according to the list information, responsive to the selecting, sending a first web service request from the client computer to the first web service, the first web service request comprising the first web service ID usable by the server for obtaining a URI for directing the first web service request to the first web service;
c) responsive to the sending, receiving first information from the first web service at the client computer;
d) responsive to user input, selecting a second web service ID of the interdependent list of web service IDs;
e) according to the list information, identifying at least one value from the first information required by the second web service;
f) formulating a second web service request comprising at least one value from the first information and the second web service ID usable by the GMWSM server for obtaining a URI for directing the second web service request to the second web service; and
g) sending the formulated second web service request from the client computer to the second web service.

14. The system according to claim 13, further comprising:
h) responsive to the sending second web service request, receiving second information from the second web service at the client computer;
i) according to the list information, responsive to user input, selecting a third web service ID of the interdependent list of web service IDs;
j) according to the list information, utilizing any one of the second information received or the first information received to formulate a third web service request; and
k) sending the formulated third web service request from the client computer to the third web service, the formulated third web service request comprising the third web service ID usable by the server for obtaining a URI for directing the third web service request to the third web service; and
l) responsive to the sending the third web service request, receiving third information from the third web service at the client computer.

15. The system according to claim 14, wherein h) through k) are repeated for sending one or more additional web service requests.

16. The system according to claim 13, further comprising:
receiving the interdependent list of web service IDs at the client computer, the interdependent list comprising metadata, the interdependent list of web service IDs configured by a GMWSM server from a configurable interdependent list of web services and associated metadata comprising the web service IDs and corresponding web service URIs;
displaying at a client graphical user interface (GUI) a representation of one or more of the plurality of web services to the user based on a configuration according to the interdependent list;
utilizing the received metadata of the interdependent list for formulating any one of the first web service request or the second web service request; and
utilizing the received metadata of the interdependent list for creating the client graphical user interface (GUI) including any one of buttons or menus, the client graphical user interface comprising the capability to navigate from a first web service result display to a second web service input display.

17. The system according to claim 16, wherein the client computer sends the first web service request to a GMWSM, wherein the client computer sends the second web service request to the GMWSM, wherein the client computer receives the interdependent list of web services and associated metadata from the GMWSM, wherein the client computer receives the first information from the GMWSM wherein the GMWSM communicates with web services on behalf of the client computer.

18. The system according to claim 16, wherein the interdependent list of web services and the metadata associated with the interdependent list of web services at the client computer consist of XML statements.

19. The system according to claim 13, further comprising:
the client computer prompting the user with candidate web service selections according to the interdependent list of web services; and
the client computer presenting the user selected selection to the user according to the interdependent list of web services, wherein the prompting and presenting interface to the user consist of any one of a GUI, audio, keypad, mouse or mechanical actuation.

20. The system according to claim 13, wherein each of the first web service request, the first information received and the second web service request comprise XML statements.

\* \* \* \* \*